United States Patent [19]

Spreen et al.

[11] Patent Number: 4,610,345

[45] Date of Patent: Sep. 9, 1986

[54] METHOD AND APPARATUS FOR ORIENTING AND DELIVERING DISPENSER CAP ASSEMBLIES

[75] Inventors: George E. Spreen, Paramus; Hans Herold, Westwood; Kazmier Wysocki, Hackensack, all of N.J.

[73] Assignee: PMC Industries, Hackensack, N.J.

[21] Appl. No.: 212,635

[22] Filed: Dec. 3, 1980

[51] Int. Cl.[4] .............................................. B65G 47/24
[52] U.S. Cl. ..................................... 198/392; 221/167
[58] Field of Search ............................... 198/391–393, 198/396, 404, 406, 719; 221/160, 167, 172

[56] References Cited

U.S. PATENT DOCUMENTS

| | | | |
|---|---|---|---|
| 2,593,627 | 4/1952 | Stover | 198/404 |
| 3,407,964 | 10/1968 | Wysocki et al. | 221/167 X |
| 3,425,530 | 2/1969 | Carter | 198/396 |
| 3,474,891 | 10/1969 | Kamila | 198/392 X |
| 3,881,596 | 5/1975 | Miller | 198/392 X |
| 3,910,407 | 10/1975 | Sterling | 198/392 |
| 4,250,988 | 2/1981 | Miaskoff | 198/719 |

Primary Examiner—Douglas D. Watts
Attorney, Agent, or Firm—Samuelson & Jacob

[57] ABSTRACT

Method and apparatus in which dispenser cap assemblies of the type having a trigger-type pump cap and a dip tube are fed to a generally cone-shaped drum which rotates about a vertical axis and carries compartments within which the cap assemblies are moved in a generally spiral outward direction while moving axially downwardly to be oriented vertically, with the cap below the dip tube, the cap assemblies then being transferred to a turnover wheel which rotates about a horizontal axis so that the cap assemblies are inverted to re-orient each cap assembly into a position where each dip tube depends vertically downwardly from the respective cap, the cap assemblies then being passed to a horizontal conveyor for advancement to a discharge point where the cap assemblies are presented serially in a prescribed alignment and orientation, at a relatively high rate, for capping operations.

57 Claims, 13 Drawing Figures

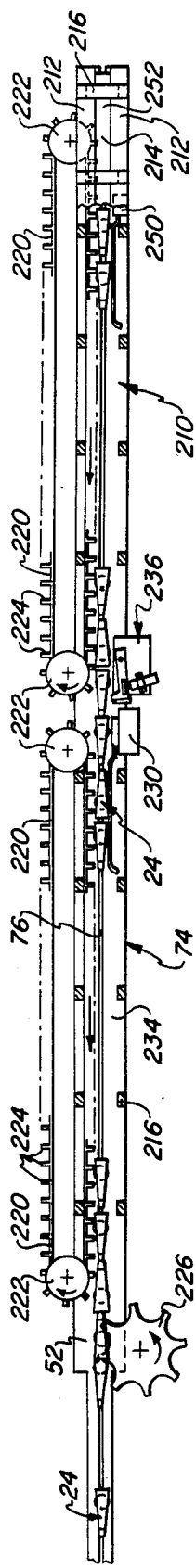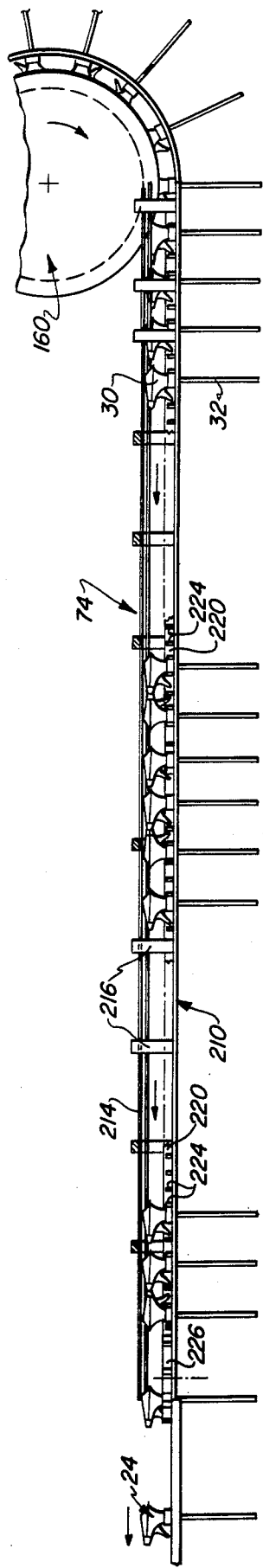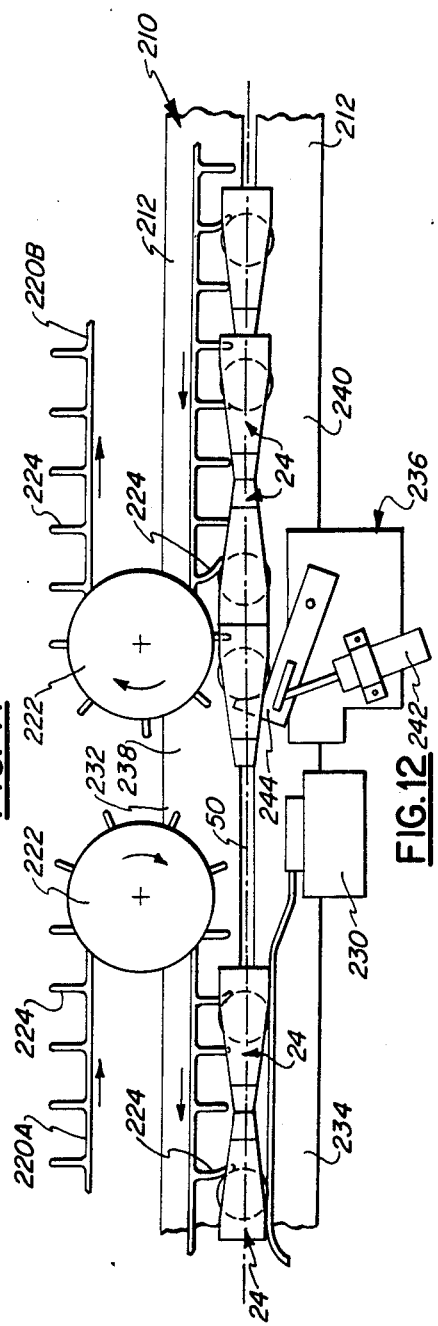
FIG. 10
FIG. 11
FIG. 12

METHOD AND APPARATUS FOR ORIENTING AND DELIVERING DISPENSER CAP ASSEMBLIES

The present invention relates generally to capping operations in which filled containers are capped with dispenser cap assemblies and pertains, more specifically, to method and apparatus for orienting and delivering such cap assemblies serially, in rapid succession, appropriately aligned and oriented for the capping operations.

Mechanized filling and capping of containers has reached a highly developed state. The increasing numbers of containers which must be filled and capped each year has led to the requirement for more rapid and efficient procedures and machines in order to keep pace with the demand. In addition to the large number of such operations, the configuration and construction of caps and containers continually are undergoing changes dictated by function and materials, as well as by aesthetic considerations, and such changes have required concomitant developments in the methods and apparatus for handling the caps and containers.

More particularly, the recent increased popularity of manually-operated pump-type dispenser cap assemblies has brought about a need for handling these cap assemblies in greater numbers and with increased efficiency. Many of the pump-type dispenser cap assemblies currently in use are constructed largely of molded synthetic resin components and are designed in a variety of shapes and sizes. These factors raise problems in handling the cap assemblies when it becomes necessary to deliver the cap assemblies serially, in rapid succession, appropriately aligned and oriented for capping operations.

It is therefore an object of the present invention to provide method and apparatus for effectively handling dispenser cap assemblies so as to faciliatate the delivery of such cap assemblies serially, in rapid succession, appropriately aligned and oriented for capping operations.

Another object of the invention is to provide method and apparatus of the type described and capable of use with the particular configurations and materials utilized in current pump-type dispenser cap assemblies.

Still another object of the invention is to provide method and apparatus of the type described and capable of handling cap assemblies with greater rapidity and increased efficiency, utilizing the available characteristics of the cap assemblies themselves as a basis for manipulating the cap assemblies.

Yet another object of the invention is to provide method and apparatus of the type described and capable of operation with reduced incidents of jamming and consequent interruption of the supply of cap assemblies and capping operations.

A further object of the invention is to provide method and apparatus by which pump-type dispenser cap assemblies having configurations which heretofore made for difficulties in orienting and delivering cap assemblies for capping operations now are delivered effectively and with sufficient rapidity to render practical the mechanized handling of such cap assemblies.

A still further object of the invention is to provide method and apparatus which enable the efficient orientation and delivery of dispenser cap assemblies within a relatively small amount of space in a capping facility so that floor space requirements are reduced within the capping plant.

Yet a further object of the invention is to provide method and apparatus of the type described and having increased simplicity so as to provide reduced costs in the manufacture and maintenance of capping facilities while increasing productivity.

Another object of the invention is to provide method and apparatus of the type described and which are not restricted to cap assemblies within a narrow range of sizes, shapes and materials, thereby encouraging the design and development of even more innovative dispenser cap assemblies.

The above objects, as well as still further objects and advantages, are attained by the present invention which may be described briefly as the method of and apparatus for orienting and delivering dispenser cap assemblies of the type having a cap and a dip tube advanced along a path of travel from a bin containing randomly oriented cap assemblies to a discharge point where the cap assemblies are presented serially in a prescribed orientation for capping operations, the method and apparatus comprising the step of and means for feeding cap assemblies from the bin to an inlet location along the path of travel, the step of and means for receiving the cap assemblies at the inlet location and imparting generally spiral movement to the cap assemblies outwardly from the inlet location while simultaneously allowing the cap assemblies to move axially downwardly relative to the inlet location so as to orient at least some of the cap assemblies with the caps thereof located below the corresponding dip tubes and place the oriented cap assemblies along a generally horizontal first segment of the path of travel, the step of and means for inverting the oriented cap assemblies to re-orient and place the re-oriented cap assemblies along a generally horizontal second segment of the path of travel with the cap of each cap assembly lying above the respective dip tube, and the step of and means for advancing the re-oriented cap assemblies along a generally horizontal third segment of the path of travel to the discharge point.

The invention will be more fully understood, while still further objects and advantages will become apparent, in the following detailed description of a preferred embodiment thereof illustrated in the accompanying drawing, in which:

FIG. 7A is an enlarged fragmentary elevational cross-sectional view taken along line 7A—7A of FIG. 7;

FIG. 10 is an enlarged plan view of a portion of FIG. 1;

FIG. 11 is in elevational view of the portion illustrated in FIG. 10; and

FIG. 12 is an enlarged fragmentary plan view of a portion of FIG. 10.

Figure 1:
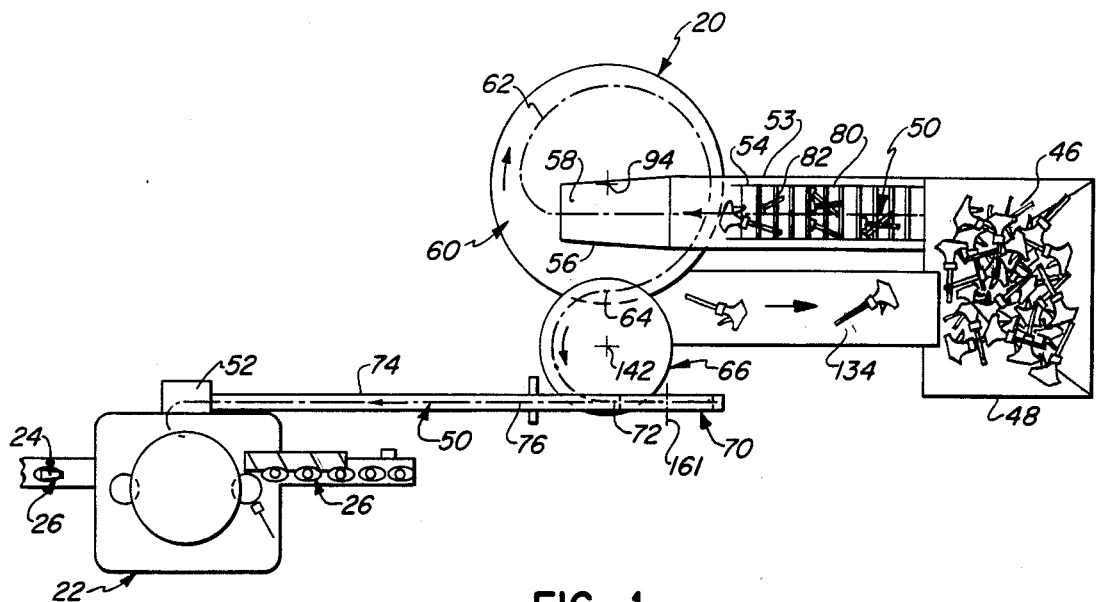
FIG. 1 is a largely diagrammatic plan view illustrating the method of and an apparatus constructed in accordance with the present invention.
Figure 2:
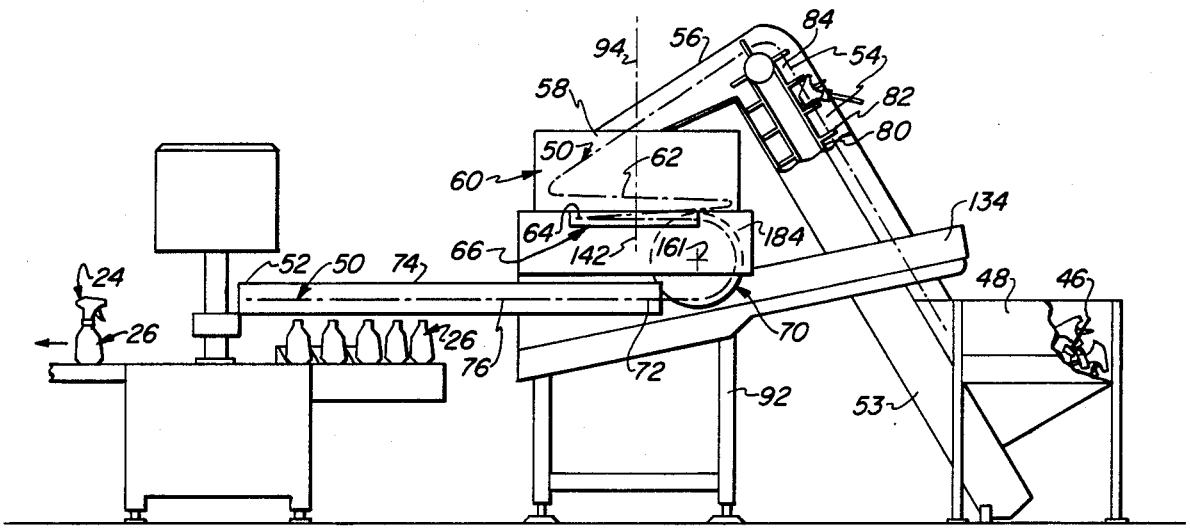
FIG. 2 is an elevational view, largely diagrammatic, of the method and apparatus of FIG. 1.

Referring now to the drawing, and especially to FIGS. 1 and 2 thereof, apparatus constructed in accordance with the invention is illustrated diagrammatically at 20 and is shown in use in connection with a capping machine 22. Together, apparatus 20 and capping machine 22 accomplish a capping operation in which a pump-type dispenser cap assembly 24, illustrated more clearly in FIG. 3, is joined with a container in the form of bottle 26 to close the container.

Figure 3:
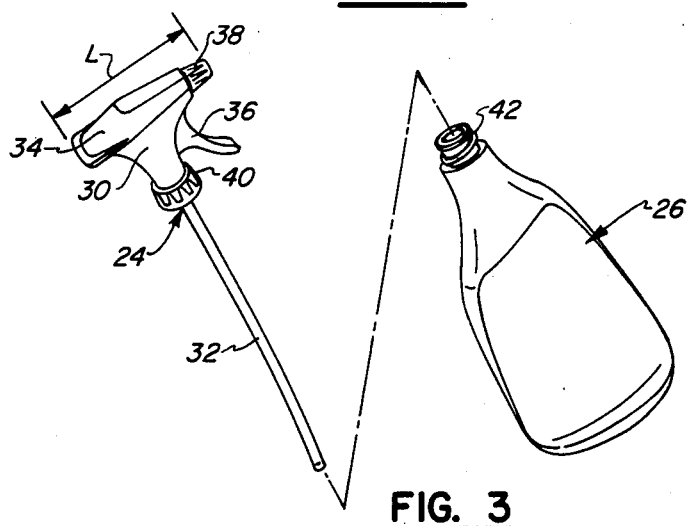
FIG. 3 is a pictorial view of a dispenser cap assembly and a container which is to be capped by the cap assembly.

As best seen in FIG. 3, cap assembly 24 includes a cap 30 and a dip tube 32 integral with the cap 30 and depending from the cap. Cap 30 has a spray pump 34 capable of manual operation by means of a trigger 36 which can be pumped to deliver a spray through a nozzle 38. A threaded collar 40 joins the cap assembly 24 to the bottle 26 which has threads 42 complementary to those of the threaded collar 40. The illustrated component parts of cap assembly 24 all are constructed of synthetic resin materials, as is bottle 26, and the contour configurations of both the cap 30 and the bottle 26 have been designed on the basis of aesthetic considerations, as well as for ergonomic reasons. The materials and configuration of cap assembly 24 place limitations upon any method and apparatus employed in handling such cap assemblies during the capping operation. Thus, the synthetic resin materials, being inherently non-magnetic, preclude the use of magnetic devices for manipulating the cap assemblies. The aesthetic and ergonomic contours provide a configuration not necessarily designed for ready location and movement by mechanical handling devices; yet, each cap assembly 24 must be delivered to a bottle 26 and joined with the bottle in only one particular relative position, as shown.

Returning now to FIGS. 1 and 2, the method and apparatus of the present invention orient and deliver cap assemblies 24 from a mass 46 of randomly oriented cap assemblies 24 contained within a bin 48 along a path of travel 50 to a discharge point 52 where the cap assemblies 24 are presented serially in a prescribed orientation to the capping machine 22 for capping. Broadly, cap assemblies 24 are fed from bin 48 by feed means in the form of a feed elevator 53 which lifts batches 54 of cap assemblies 24 from mass 46 to an inlet chute 56 which leads the batches 54 to an inlet location 58 located along path of travel 50 above a first orienting means 60. As will be described in greater detail below, first orienting means 60 receives the randomly oriented cap assemblies 24 at the inlet location 58 and imparts to the cap assemblies 24 a generally spiral movement outwardly from the inlet location 58, as indicated at leg 62 of path of travel 50, while allowing the cap assemblies 24 to move axially downwardly. First orienting means 60 takes advantage of the fact that the cap 30 of each cap assembly 24 is heavier than the respective dip tube 32 and is arranged so that the heavier cap 30 will drop downwardly ahead of the lighter dip tube 32 to orient each cap assembly 24 with the cap 30 vertically below the dip tube 32 and to place the so-oriented cap assemblies 24 along a generally horizontal segment 64 of the path of travel 50. However, capping machine 22 requires cap assemblies 24 oriented vertically with each dip tube 32 depending downwardly from a respective cap 30. Hence, the cap assemblies 24 which have been oriented with the caps 30 below the dip tubes 32, by taking advantage of the difference in weight between the caps 30 and the dip tubes 32, now must be re-oriented to the proper orientation for capping machine 22. Such re-orientation is accomplished as follows.

While traveling along segment 64 of the path of travel 50, cap assemblies 24 are transferred by a transfer means 66 to a second orienting means 70. Second orienting means 70 grips the cap assemblies 24 and inverts the cap assemblies 24 to re-orient each cap assembly and place the re-oriented cap assemblies 24 along another generally horizontal segment 72 of path of travel 50, with the cap 30 of each cap assembly 24 now lying above the corresponding downwardly-depending dip tube 32. The re-oriented cap assemblies 24 then are advanced by a conveyor means 74 along a generally horizontal further segment 76 of path of travel 50 to the discharge point 52 where the capping machine 22 can join the cap assemblies 24 with bottles 26. It is noted that the details of the capping method and capping machine 22 form no part of the present invention. Suffice it to say that the capping machine 22 relies upon the delivery of cap assemblies 24 serially, in appropriate alignment and orientation, and in sufficient quantity to effect a high-speed mechanized operation. Thus, the speed at which the cap assemblies 24 are to be delivered to delivery point 52 must be high enough to deliver about 120 to 240 cap assemblies per minute in proper alignment and orientation.

Figure 4:
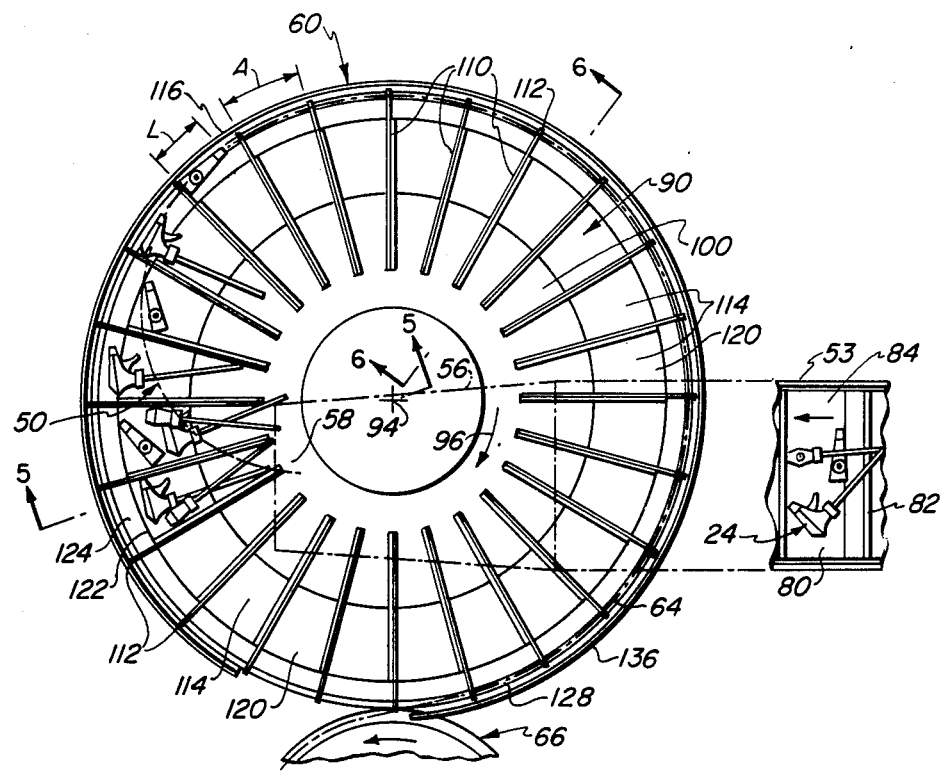
FIG. 4 is an enlarged fragmentary plan view of a portion of FIG. 1.
Figure 5:
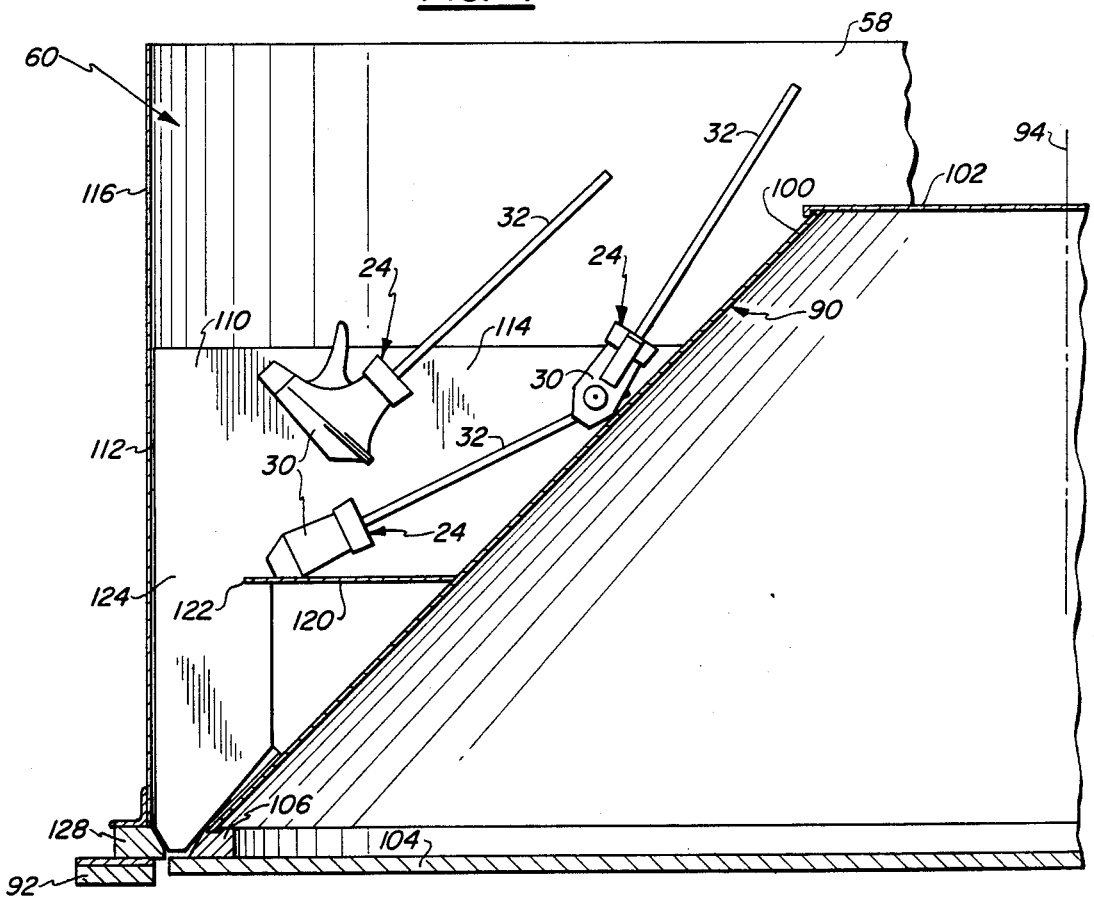
FIG. 5 is a further enlarged fragmentary elevational cross-sectional view taken along line 5—5 of FIG. 4.
Figure 6:
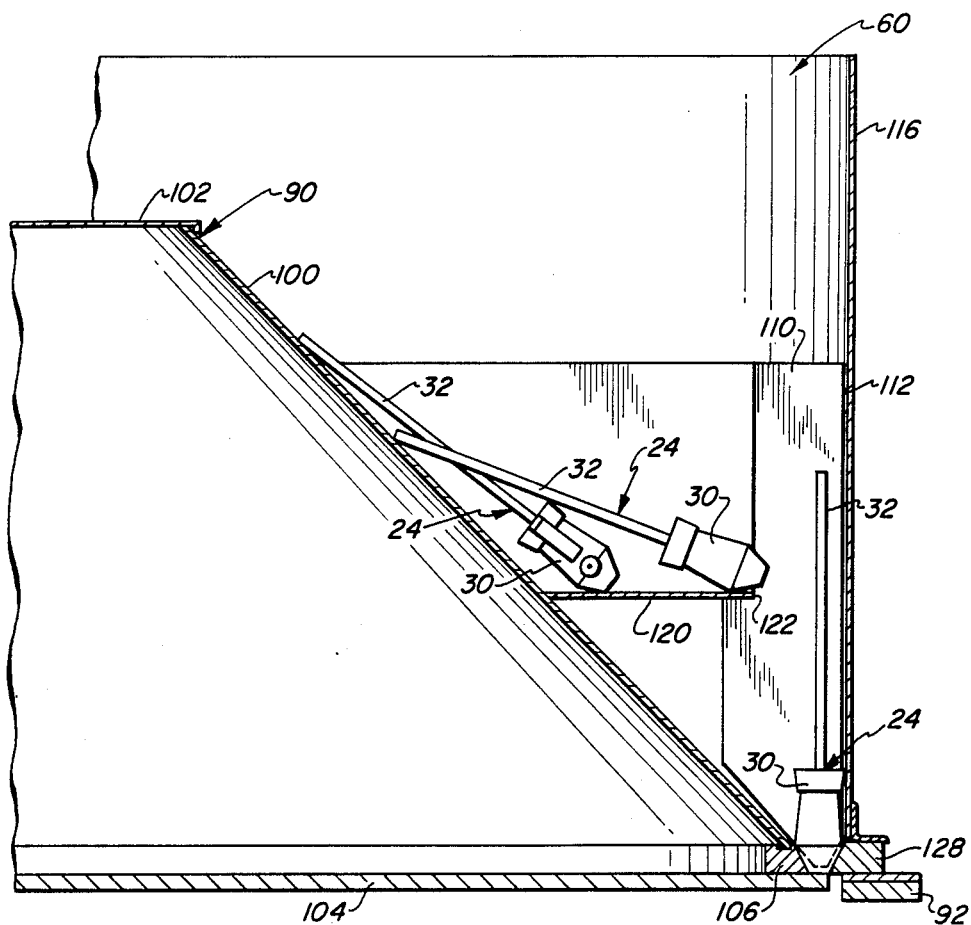
FIG. 6 is an enlarged fragmentary elevational cross-sectional view taken along line 6—6 of FIG. 4.

Turning now to FIGS. 4, 5 and 6, as well as to FIGS. 1 and 2, feed elevator 53 has a cleated conveyor 80 carrying cleats 82 which establish pockets 84 within which batches 54 of cap assemblies 24 are carried to inlet chute 56. The cap assemblies 24 descend along inlet chute 56 to inlet location 58 where the cap assemblies 24 are dropped onto a drum 90 which forms a part of the first orienting means 60. Drum 90 is mounted upon frame 92 of apparatus 20 for rotation relative to the frame 92 about a vertical axis 94 in a clockwise direction as indicated by arrow 96, and includes a generally frusto-conical surface 100 which diverges downwardly from crown 102 of the drum 90 to base 104 of the drum 90. Crown 102 is juxtaposed with inlet location 58 and base 104 is affixed to a contoured drive disc 106 which rotates, with drum 90, in juxtaposition with segment 64 of path of travel 50.

A plurality of vertical partitions 110 are carried by the frusto-conical surface 100 of drum 90 and extend radially outwardly to outer vertical edges 112. Partitions 110 establish compartments 114 which rotate as the drum 90 rotates. A generally cylindrical stationary fence 116 extends around a major portion of the drum 90 and extends vertically upwardly adjacent the vertical edges 112 of partitions 110 so as to form an outer wall for each compartment 114. A baffle plate 120 is affixed to the drum 90 and extends radially outwardly into each compartment 114 intermediate the crown 102 and base 104 of the drum 90. Baffle plate 120 terminates at an outer periphery 122 having a diameter less than the diameter of fence 116 so as to establish a slot 124 in each compartment 114 between the outer periphery 122 and the fence 116. Slot 124 overlies segment 64 of path of travel 50.

As the cap assemblies 24 are received upon surface 100 of the rotating drum 90, one or more cap assemblies will fall into each compartment 114. Since the cap 30 is heavier than the dip tube 32, the cap 30 will tend to lead the dip tube 32 of each cap assembly 24 as the cap assemblies 24 are moved by the rotating drum 90 and compartments 114. The caps 30 will drop onto baffle plate 120, as seen in FIG. 5, and continued rotation of drum 90 and compartments 114, will exert forces upon the cap assemblies 24 so that, as a result of the speed of entry of the cap assemblies 24 into compartments 114 and the centrifugal forces upon cap assemblies 24, the cap assemblies will move outwardly beyond the outer periphery 122 of baffle plate 120 and will drop downwardly, through slot 124, cap 30 first, toward the rotating drive disc 106 and segment 64 of path of travel 50, as seen in FIG. 6. Each cap assembly 24 which arrives at segment 64 thus is oriented with the cap 30 located below the dip tube 32 and is aligned with the dip tube 32 extending vertically upwardly. The contoured drive disc 106 is juxtaposed with a stationary contoured rail 128 which is affixed to the frame 92 of apparatus 20. Together, the drive disc 106 and the rail 128 provide a contour complementary to a portion of the cap 30 so that the cap 30 is seated and held in proper alignment as the cap assembly 24 is swept along the path of travel 50. The contoured drive disc 106 and rail 128 also assure that as the cap assemblies 24 are moved along at drive disc speed, the cap assemblies will not tip forward or backward, but will remain in vertical alignment. This is so, even though the cap 30 may be oriented with the trigger 36 and nozzle 38 either leading or trailing.

It is noted that compartment 114 has an arcuate length A at the path of travel 50 which is only slightly longer than the corresponding length L of each cap 30. Hence, only one cap assembly 24 per compartment 114 will be seated properly between drive disc 106 and rail 128. Any further cap assemblies 24 within a single compartment 114 will be swept along within that compartment until the compartment reaches an eject location 130, best seen in FIG. 7. At the eject location 130, the fence 116 is discontinued and the stationary contoured rail 128 is reduced in height to allow cap assemblies 24 which have not been fully oriented and seated, or which are overlapping with other cap assemblies, or which are excess, to be ejected and discharged to a chute 132 to be passed to a return conveyor 134 which returns the ejected cap assemblies 24 to bin 48. The properly seated and oriented cap assemblies 24 are retained against tipping radially outwardly as they travel beyond the termination of fence 116 in the vicinity of eject location 130 by means of a dip tube guide bar 136. The feeding of a number of cap assemblies 24 in excess of those which will become oriented and seated in proper alignment and the recirculation of the ejected excess cap assemblies enables orienting means 60 to operate at a relatively high rate of speed. Thus, about 120 to 240 cap assemblies can be oriented per minute.

The oriented cap assemblies 24 then are transferred from the orienting means 60 by transfer means 66 which includes a transfer disc 140, mounted on frame 92 for rotation about a vertical axis 142 spaced laterally from the axis of rotation 94 of drum 90 of orienting means 60. Transfer disc 140 is rotated in a counterclockwise direction, as viewed in FIG. 7. Transfer of the oriented cap assemblies 24 to the transfer disc 140 is accomplished by a transfer guide finger 144 located at the point of tangency 146 between the rotating drum 90 and the rotating transfer disc 140, and which projects toward the rotating drum 90 at the level of the caps 30 of the oriented cap assemblies 24, and a guide bar 148 which begins at the point of tangency 146 at a level above the transfer disc 140, and corresponding to the level of dip tubes 32 to serve essentially as a continuation of guide bar 136, but placed laterally at the opposite side of each dip tube 32 (also see FIG. 7A). Thus, the caps 30 of the oriented cap assemblies 24 are intercepted by guide finger 144 and the dip tubes 32 are intercepted by the guide bar 148 to change the direction of travel of the cap assemblies 24 to follow the periphery of the transfer disc 140. At the point of tangency 146, any caps 30 which may be without dip tubes 32 are rejected by virtue of the failure to be deflected by guide bar 148. The rejected caps 30 will drop into a further chute 149 to be passed to return conveyor 134.

In order to prevent overlapping of adjacent caps 30 in the stream of advancing cap assemblies 24 during transfer from drum 90 to transfer disc 140, transfer disc 140 is rotated at a rate which provides a surface speed at the outer periphery thereof slightly greater than the surface speed of the drum 90. In this manner the cap assemblies 24 are accelerated as they pass from the drum 90 to the transfer disc 140 and the spacing between adjacent cap assemblies 24 is increased slightly to assure that the cap assemblies do not overlap. Such overlapping could disturb the smooth flow of properly oriented cap assemblies and is to be avoided.

Figure 7:
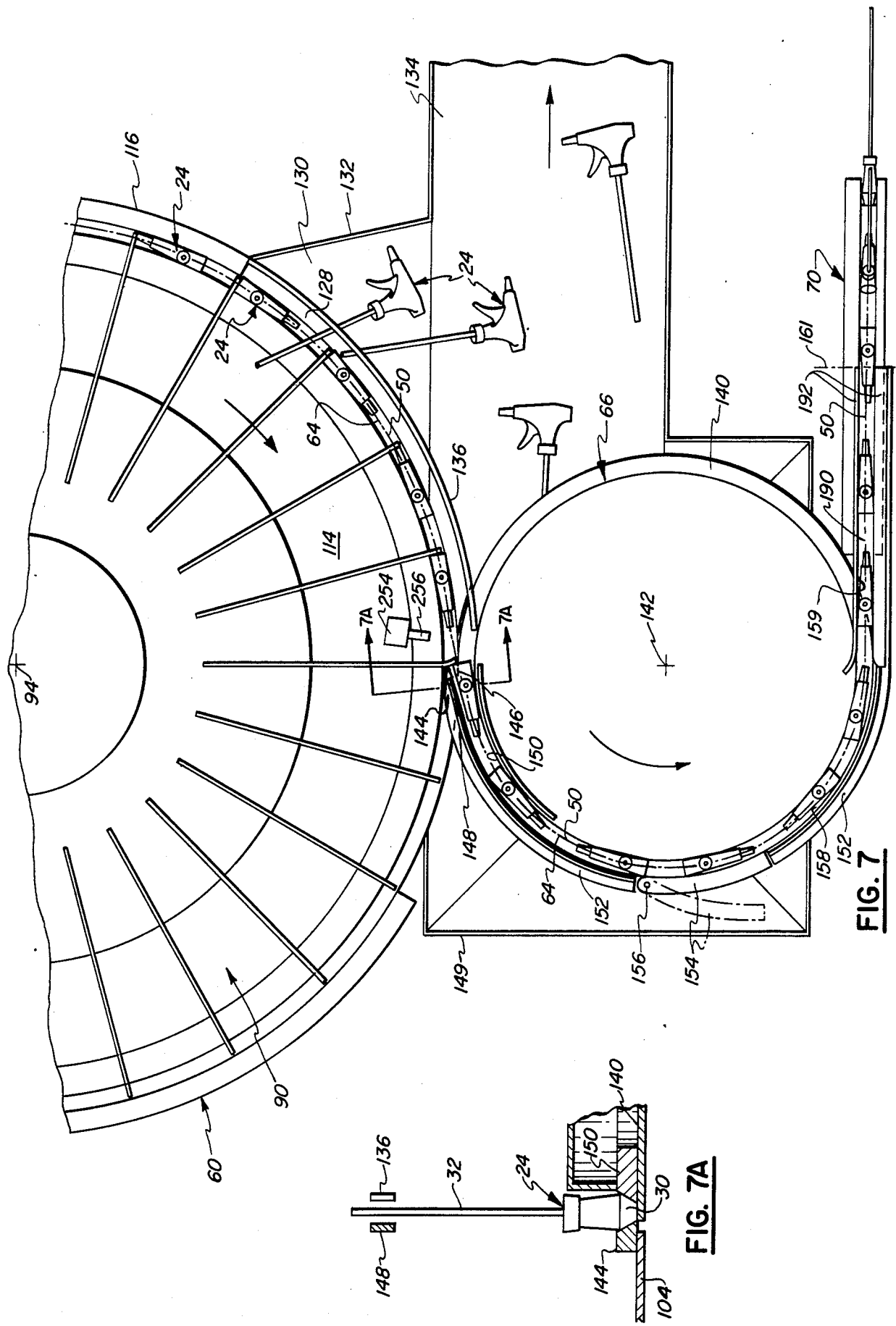
FIG. 7 is an enlarged fragmentary plan view of a further portion of FIG. 1.

As shown in FIGS. 7 and 7A, the transfer disc 140 is provided with a contoured inner ring 150 complementary to the configuration of the corresponding portions of caps 30. A fixed outside rail 152, which continues from transfer guide finger 144, also has a complementary contour and serves to retain the cap assemblies 24 within path of travel 50 and against the transfer disc 140 for movement by the transfer disc. At the same time, guide bar 148 is extended along an arc corresponding to the path of travel 50, but at the level of dip tubes 32 to aid in the retention of the cap assemblies 24 within the prescribed path of travel 50.

Outside guide rail 152 is provided with a section 154 which is mounted for selective pivotal movement about a vertical pin 156 so as to enable section 154 to be swung away from the transfer disc 140 and path of travel 50, as illustrated in phantom in FIG. 7. Thus, should a jam occur downstream of section 154, in the vicinity of leg 158 of path of travel 50, where the cap assemblies 24 exit from the transfer disc 140, section 154 may be swung open, by manual selection, to enable the stream of cap assemblies 24 already being moved by the transfer disc 140 to continue flowing undisturbed until the jam is cleared. The cap assemblies 24 ejected at section 154 will fall into chute 149 and will be passed to return conveyor 134 for return to bin 48. Such a jam can occur when the cap assemblies 24 are not properly oriented and may overlap one another in the vicinity of leg 158. Only properly oriented cap assemblies 24 can be accepted at the exit 159 from the transfer disc 140, as will be explained below, and improperly oriented cap assemblies 24 must be ejected.

It is noted that the segment 64 of path of travel 50 followed by the oriented cap assemblies 24 is made long enough so that the oriented cap assemblies 24 will have sufficient time to settle down and become stabilized in the desired orientation while moving along the path of travel 50. That is, any tendency for the cap assemblies 24 to rock forward and backward, or side-to-side, as the cap assemblies become seated within the contoured surfaces which guide the cap assemblies along the prescribed path of travel, while the cap assemblies are maintained in proper orientation, eventually is overcome by means of the lineal extent of the segment 64 which provides time for the stabilization of the cap assemblies within the stream of advancing cap assemblies. Thus, the transfer means 66, and especially transfer disc 140, serves to effect an orderly transfer of the stream of cap assemblies 24 and provides means by which the cap assemblies 24 are stabilized for effective transfer to the second orienting means 70.

Figure 8:
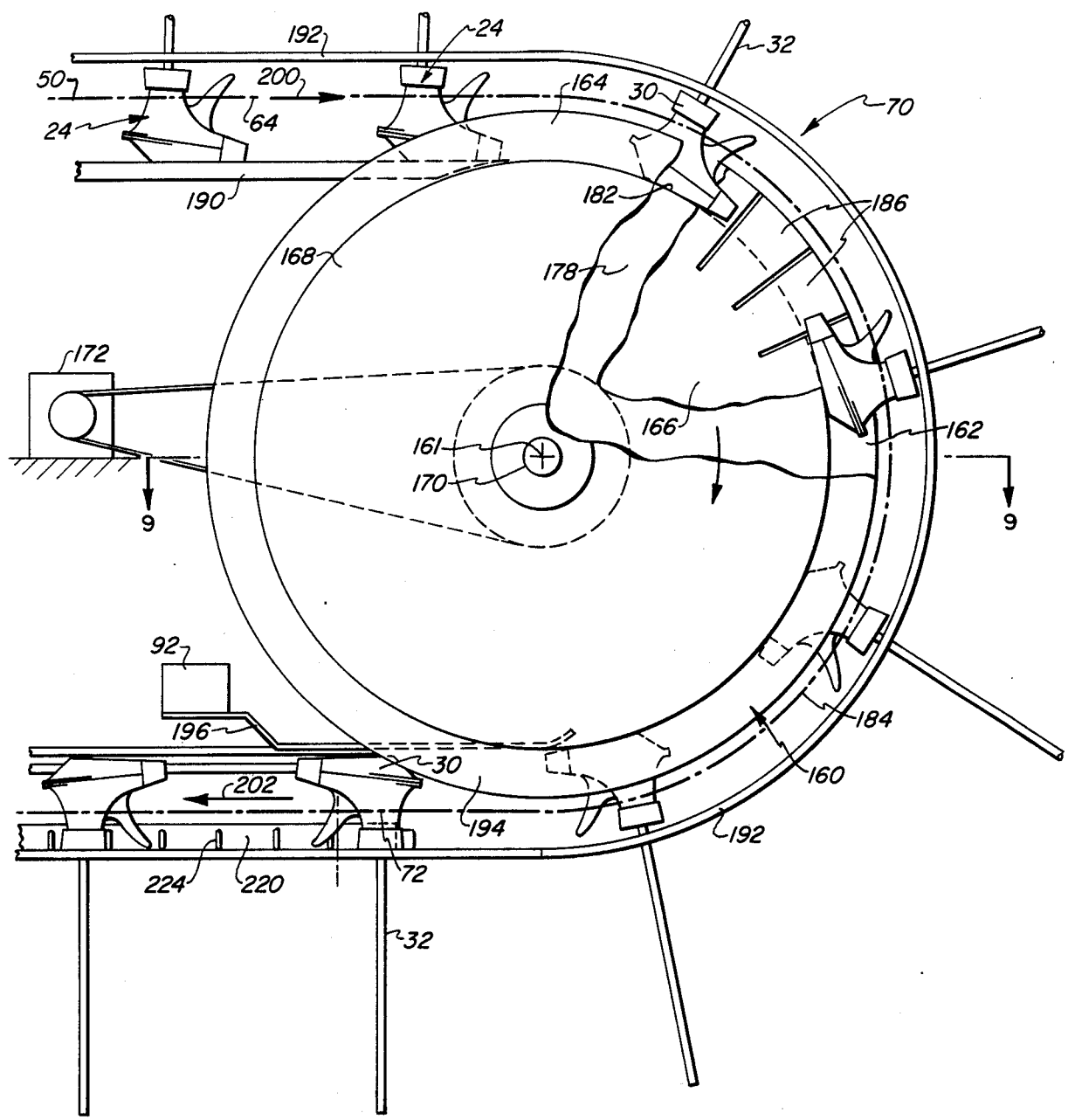
FIG. 8 is an enlarged fragmentary elevational view of a portion of FIG. 2.
Figure 9:
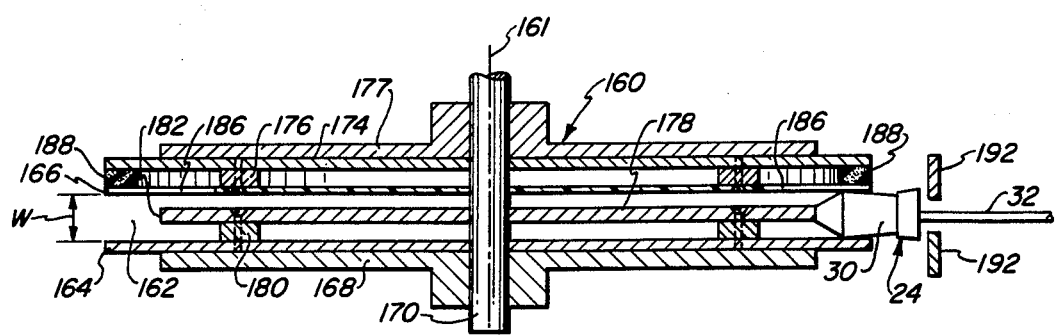
FIG. 9 is a cross-sectional view taken along line 9—9 of FIG. 8.

Turning now to FIGS. 8 and 9, as well as to FIGS. 1, 2 and 7, the second orienting means 70 includes a turnover wheel 160 mounted upon frame 92 for rotation about a generally horizontal axis 161. Turnover wheel 160 receives each cap assembly 24 from segment 64 of the path of travel 50 and moves the cap assemblies 24 to segment 72 of path of travel 50 while at the same time inverting the cap assemblies 24 so that the cap assemblies 24 at segment 72 are re-oriented, with the dip tubes 32 depending downwardly from the respective caps 30.

Turnover wheel 160 includes an annular channel 162 around the outer periphery of the wheel, the channel being essentially tangent to segments 64 and 72 of path of travel 50 and having a width W extending axially between a first disc 164 and a second disc 166. Disc 164 is affixed to a hub 168 which, in turn, is secured to a drive shaft 170 rotated by drive means 172 in a clockwise direction, as viewed in FIG. 8, drive means 172 thus positively driving the turnover wheel 160. Second disc 164 is affixed to a third disc 174, but is spaced axially therefrom by spacers 176. Third disc 174 is affixed to a hub 177 which also is secured to drive shaft 170 for rotation therewith. A fourth disc 178 is carried by the first disc 164 for rotation therewith and is spaced from the first disc 164 by spacers 180. Fourth disc 178 has an overall diameter less than the diameters of first and second discs 164 and 166 and provides a bottom surface 182 within channel 162.

The relative dimensions of the width of each cap 30 and the corresponding width W of channel 162 are such that the caps 30 of the cap assemblies 24 will be gripped positively for advancement of the cap assemblies 24 along an arcuate segment 184 of the path of travel 50, arcuate segment 184 interconnecting horizontal segments 64 and 72. The grip of the turnover wheel 160 upon the cap assemblies 24 must be firm, yet gentle, to accomplish the necessary movement without damage to the cap assemblies 24. Furthermore, that grip must be effected irrespective of the front-to-back arrangement of each cap assembly; that is, the grip must be effective whether the trigger 36 and nozzle 38 of a cap 30 are leading or trailing as the cap 30 enters channel 162. In addition, the grip must be capable of slipping to enable the turnover wheel 160 to continue to rotate at a fixed rate of speed in response to the positive drive of drive means 172, in the event that the cap assemblies 24 become jammed or backlogged by virtue of events downstream of the turnover wheel 160, without damage to the cap assemblies 24 or to the turnover wheel 160.

In order to effect the necessary grip, disc 166 is constructed of a relatively flexible material and is divided, along the outer periphery thereof, into a plurality of radially extending fingers 186 capable of flexing axially in response to the reception of a cap assembly 24 within channel 162. Resilient biasing means is provided in the form of a ring 188 of resiliently compressible material secured between the fingers 186 and third disc 174 such that the fingers 186 each are biased resiliently into the channel 162. Thus, the cap assemblies 24 are gripped in an interference fit and are held gently enough for ready release. Preferably, disc 166 is fabricated of a synthetic resin material having appropriate surface frictional characteristics, as well as the necessary flexibility, such as high density polyethylene (HMW 1900 polyethylene), and ring 188 is fabricated of a compressible foamed synthetic resin material, such as an expanded foam elastomer.

The cap assemblies 24 are led to the turnover wheel 160 along a transfer plate 190 which intercepts the stream of cap assemblies 24 being moved by transfer disc 140 at exit 159, tangent to the inner ring 150 and outside guide rail 152. Further guide rails 192 extend from exit 159 and are spaced apart to enable passage of the dip tubes 32 of the cap assemblies 24 therebetween as the cap assemblies 24 are guided along the transfer plate 190. The guide rails 192 extend around the periphery of turnover wheel 160 so that the guide rails 192 will serve as a back-up means tending to assure that the cap assemblies 24 will not deviate from the arcuate segment 184 of path of travel 50. Upon release of the cap assemblies 24 from turnover wheel 160, at segment 72 of path of travel 50, guide rails 192 become a support upon which the moving cap assemblies 24 are supported. Release of cap assemblies 24 from the turnover wheel 160 is effected at location 194 by means of a release arm 196 which projects into channel 162 and engages each cap assembly 24 to move the cap assemblies 24 out of the channel 162 and onto the guide rails 192, thereby placing the cap assemblies along segment 72 of path of travel 50.

As a further precaution against the possibility of adjacent cap assemblies 24 abutting one another or even overlapping one another and thereby disturbing the uniform flow of cap assemblies 24 in a downstream direction along path of travel 50, turnover wheel 160 is driven at a rate of speed which will accelerate each cap assembly 24 slightly when the cap assembly is picked up from transfer plate 190 so as to tend to increase slightly the spacing between adjacent cap assemblies traveling along arcuate segment 184 of path of travel 150.

It is noted that the downstream direction is from the left to the right, as indicated by arrow 200 in FIG. 8, in segment 64 of the path of travel 50 and is reversed in segment 72 of the path of travel so as to be in the direction of arrow 202. The reversal of the downstream direction coupled with the location of segment 64 above segment 72 enables a decrease in the length of apparatus 20 and thereby effects a saving in floor space occupied in the capping facility.

Once the cap assemblies 24 are re-oriented to place them in appropriate orientation for capping operations in capping machine 22, the re-oriented cap assemblies 24 must be delivered, single-file, serially to the discharge point 52. It is emphasized that the cap assemblies 24, by virtue of the configuration of caps 30, are very unstable during movement in single-file toward the capping machine in appropriate orientation and are very susceptible to jamming. The configuration of the leading and trailing portions of the spray pump 34, which includes trigger 36 and nozzle 38, increases the tendency for shingling and overlapping, thereby causing the caps 30 to be raised within any confining track structure, with the result that the cap assemblies can become locked together or jammed within the track structure. The conveyor means 74 advances the cap assemblies 24 along further segment 76 of path of travel 50 in such a way as to avoid jamming, while assuring that the cap assemblies arrive at discharge point 52 in the appropriate orientation and at the desired high rate.

Referring now to FIGS. 10, 11 and 12, conveyor means 74 includes a track assembly 210 extending generally horizontally along the further segment 76 of path of travel 50 between the segment 72 of path of travel 50 and the discharge point 52. Track assembly 210 has a pair of laterally spaced rails 212 which support the caps 30 at collars 40 so that dip tubes 32 depend downwardly and pass between the rails 212. A third rail 214 is supported by vertical supports 216 and extends over the path of travel 50 to confine the caps 30 against vertical upward movement as the cap assemblies 24 move longitudinally along the track assembly 210.

Movement is imparted to cap assemblies 24 by conveyors shown in the form of endless belts 220 passing around pulleys 222 which drive the belts 220 continuously along a path parallel to segment 76 of path of travel 50, and parallel to track assembly 210. Each belt 220 serves as a carrier for a plurality of flexible members in the form of pushers 224 projecting laterally into the path of travel 50 and spaced longitudinally along the belts 220. The lateral projection of the pushers 224 is such that the pushers 224 engage the collars 40 of the cap assemblies 24 to advance the cap assemblies 24 along the track assembly 210.

Pushers 224 are constructed so as to have a size and stiffness which enables the pushers 224 to engage and advance the cap assemblies 24 as described. However, the pushers 224 are made flexible enough, in longitudinal directions, so that the pushers 224 will flex and pass over the collars 40 of the cap assemblies 24 before sufficient force can be exerted by the pushers 224 to cause jamming or locking up of the cap assemblies, should the cap assemblies 24 resist forward movement by the pushers 224. Thus, the pushers 224 are released from pushing engagement with cap assemblies 24 by flexing and passing over the collar 40 of a cap assembly 24 which is stopped by abutment with the cap assembly immediately ahead. Preferably, pushers 224 are fabricated as cleats which are integral with belts 220 so that the belts 220 can be molded of an elastomeric material which will provide flexible pushers 224 unitary with the belts 220.

The overall length of conveyor means 74 is great enough to enable the cap assemblies 24 to become stabilized during travel along the track assembly 210 and to make available an adequate supply of stabilized, appropriately oriented cap assemblies 24 at the discharge point 52. Upon arrival at discharge point 52, the feed of cap assemblies 24 is metered by a star wheel 226 which rotates to feed the cap assemblies 24 at prescribed intervals for the spacing desired between adjacent cap assemblies 24.

In order to assure further that jamming of the cap assemblies 24 will be precluded in track assembly 210, two belts 220 are employed over the length of track assembly 210, rather than one. As best seen in FIG. 12, a sensing device 230 is located adjacent the upstream end 232 of a downstream section 234 of the track assembly 210, which downstream section 234 is served by the downstream belt 220A. When the downstream section 234 becomes filled with cap assemblies 24 awaiting feed by the star wheel 226, sensing device 230 will detect the presence of abutted cap assemblies 24 at the upstream end 232 and will activate a latching mechanism 236, located adjacent the downstream end 238 of an upstream section 240 of track assembly 210, to energize an actuator 242 to move a latch 244 into the path of travel 50, between the downstream section 234 and the upstream section 240 of the track assembly 210. Thus actuated, the latch 244 will hold back further cap assemblies 24 from the downstream section 234, and the further cap assemblies will begin to collect in the upstream section 240. In this manner the desired number of cap assemblies 24 is maintained in the track assembly 210, but the accumulated forces exerted upon the downstream cap assemblies 24 within each section 234 or 240 by the upstream cap assemblies 24 is limited to only those forces exerted by one belt 220 of limited length since the upstream belt 220B will not exert forces which can be transmitted to the cap assemblies 24 located in the downstream section 234.

In order to preclude a back-up of cap assemblies into the turnover wheel 160, another sensing device 250 (see FIG. 10) is located adjacent the upstream end 252 of the upstream section 240 of track assembly 210 to detect the presence of abutted cap assemblies 24 at the upstream and 252. Upon filling of the upstream section 240 with abutted cap assemblies 24, sensing device 250 will be actuated to deactivate drive means 172 and discontinue the rotation of turnover wheel 160. At the same time, sensing device 250 will activate a diverter mechanism 254 (see FIG. 7) located adjacent the point of tangency 146 between the rotating drum 90 and the rotating transfer disc 140. Actuation of the diverter mechanism 254 will advance a diverter rod 256 into the path of travel of the dip tubes 32 of the cap assemblies 24 traveling toward the point of tangency 146 so as to trip the cap assemblies and cause them to be discharged down chute 149 to return conveyor 134. Thus, the feed of cap assemblies to the turnover wheel 160 will be discontinued without disrupting the continuous operation of the remainder of the apparatus.

It will be seen that the method and apparatus described above provides for the effective handling of dispenser cap assemblies and facilitate the delivery of such cap assemblies serially, in rapid succession, appropriately aligned and oriented for capping operations.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. The method of orienting and delivering dispenser cap assemblies of the type having a relatively heavier cap and a relatively lighter dip tube advanced along a path of travel from a bin containing randomly oriented cap assemblies to a discharge point where the cap assemblies are presented serially in a prescribed orientation for capping operations, the method comprising the steps of:

feeding cap assemblies from the bin to an inlet location and imparting generally spiral movement to the cap assemblies outwardly from the inlet location to place the heavier caps of at least some of the cap assemblies outwardly relative to the respective lighter dip tubes of the cap assemblies;

allowing the outwardly-placed caps of the cap assemblies to drop downwardly relative to the inlet location ahead of the respective dip tubes of the cap assemblies so as to orient at least some of the cap assemblies with the caps thereof located below the respective dip tubes and place the oriented cap assemblies along a generally horizontal first segment of the path of travel;

inverting the oriented cap assemblies to re-orient and place the re-oriented cap assemblies along a generally horizontal second segment of the path of travel with the cap of each cap assembly lying above the respective dip tube, the first and second segments of the path of travel being located at different elevations such that the oriented cap assemblies follow an arcuate segment of the path of travel between the first and second segments as the cap assemblies are re-oriented; and advancing the re-oriented cap assemblies along a generally horizontal third segment of the path of travel to the discharge point.

2. The invention of claim 1 wherein the cap assemblies are fed from the bin to the inlet location in relatively small batches of randomly oriented cap assemblies, the inlet location being elevated relative to the bin so that the batches are raised from the bin to the inlet location.

3. The invention of claim 1 wherein the first segment of the path of travel is located at an elevation above the elevation of the second segment of the path of travel.

4. The invention of claim 1 or 3 wherein the cap assemblies are gripped positively to move the cap assemblies along the arcuate segment of the path of travel.

5. The invention of claim 1 wherein the oriented cap assemblies are stabilized during advancement along the first segment of the path of travel.

6. The invention of claim 5 wherein the first segment of the path of travel has an extent great enough to enable stabilization of the oriented cap assemblies advanced along the first segment.

7. The invention of claim 1 wherein the re-oriented cap assemblies are stabilized during advancement along the third segment of the path of travel.

8. The invention of claim 7 wherein the third segment of the path of travel has an extent great enough to enable stabilization of the re-oriented cap assemblies advanced along the third.

9. The invention of claim 1 wherein the oriented cap assemblies are accelerated during movement along the first segment of the path of travel so as to increase the space between consecutive cap assemblies moving along the first segment of the path of travel.

10. The invention of claim 1 or 9 wherein the cap assemblies are accelerated during movement between the first and second segments of the path of travel so as to increase the space between consecutive cap assemblies moving between the first and second segments of the path of travel.

11. The invention of claim 10 wherein the cap assemblies are gripped positively during movement between the first and second segments of the path of travel.

12. Apparatus for orienting and delivering dispenser cap assemblies of the type having a relatively heavier cap and a relatively lighter dip tube advanced along a path of travel from a bin containing randomly oriented cap assemblies to a discharge point where the cap assemblies are presented serially in a prescribed orientation for capping operations, the apparatus comprising:

means for feeding cap assemblies from the bin to an inlet location along the path of travel;

means for receiving cap assemblies at the inlet location and imparting generally spiral movement to the cap assemblies outwardly from the inlet location to place the heavier caps of at least some of the cap assemblies outwardly relative to the respective lighter dip tubes of the cap assemblies;

means for allowing the outwardly-placed caps of the cap assemblies to drop downwardly relative to the inlet location ahead of the respective dip tubes of the cap assemblies so as to orient at least some of the cap assemblies with the caps thereof located below the respective dip tubes and place the oriented cap assemblies along a generally horizontal first segment of the path of travel;

means for inverting the oriented cap assemblies to re-orient and place the re-oriented cap assemblies along a generally horizontal second segment of the path of travel with the cap of each cap assembly lying above the respective dip tube, the first and second segments of the path of travel being located at different elevations;

means providing the path of travel with an arcuate segment between the first and second segments such that the cap assemblies follow the arcuate segment as the cap assemblies are re-oriented; and means for advancing the re-oriented cap assemblies along a generally horizontal third segment of the path of travel to the discharge point.

13. The invention of claim 12 wherein the means for feeding the cap assemblies from the bin to the inlet location includes further means for feeding the cap assemblies in relatively small batches of randomly oriented cap assemblies, and the inlet location is elevated relative to the bin so that the batches are raised by the further means from the bin to the inlet location.

14. The invention of claim 12 wherein the first segment of the path of travel is located at an elevation above the elevation of the second segment of the path of travel.

15. The invention of claim 12 or 14 including means for gripping the cap assemblies positively to move the cap assemblies along the arcuate segment of the path of travel.

16. The invention of claim 12 including stabilizing means for enabling the oriented cap assemblies to be stabilized during advancement along the first segment of the path of travel.

17. The invention of claim 16 wherein the stabilizing means comprises means providing first segment of the path of travel with an extent great enough to enable stabilization of the oriented cap assemblies advanced along the first segment.

18. The invention of claim 12 including stabilizing means for enabling the re-oriented cap assemblies to be stabilized during advancement along the third segment of the path of travel.

19. The invention of claim 18 wherein the stabilizing means comprises means providing the third segment of the path of travel with an extent great enough to enable stabilization of the re-oriented cap assemblies advanced along the third segment.

20. The invention of claim 12 including means for accelerating the oriented cap assemblies during movement along the first segment of the path of travel so as to increase the space between consecutive cap assemblies moving along the first segment of the path of travel.

21. The invention of claim 12 or 20 including means for accelerating the cap assemblies during movement between the first and second segments of the path of travel so as to increase the space between consecutive cap assemblies moving between the first and second segments of the path of travel.

22. The invention of claim 21 including means for gripping the cap assemblies positively during movement between the first and second segments of the path of travel.

23. Apparatus for orienting and delivering dispenser cap assemblies of the type having a relatively heavier cap and a relatively lighter dip tube advanced along a path of travel from a bin containing randomly oriented cap assemblies to a discharge point where the cap assemblies are presented serially in a prescribed orientation for capping operations, the apparatus comprising:

feed means for feeding cap assemblies from the bin to an inlet location along the path of travel;

first orienting means located along the path of travel and including means rotatable about a generally vertical axis for receiving cap assemblies at the inlet location and imparting generally spiral outward movement to the cap assemblies to place the heavier caps of at least some of the cap assemblies outwardly relative to the respective lighter dip tubes of the cap assemblies and means for allowing the outwardly-placed caps of the cap assemblies to drop downwardly ahead of the respective dip tubes of the cap assemblies so as to orient at least some of the cap assemblies with the dip tubes thereof extending essentially vertically and the caps thereof located below the respective dip tubes, and to place the oriented cap assemblies along a generally horizontal first segment of the path of travel;

second orienting means located along the path of travel and including means rotatable about a generally horizontal axis for receiving the oriented cap assemblies and inverting the received cap assemblies to re-orient and place the received cap assemblies along a generally horizontal second segment of the path of travel with the cap of each cap assembly lying above the respective dip tube;

transfer means for transferring the oriented cap assemblies from the first orienting means to the second orienting means; and conveyor means for receiving the re-oriented cap assemblies from the second segment of the path of travel and conveying the received cap assemblies along a generally horizontal third segment of the path of travel to the discharge point.

24. The invention of claim 23 wherein:

the feed means includes a plurality of movable pockets for feeding the cap assemblies in relatively small batches of randomly oriented cap assemblies; and the inlet location is elevated relative to the bin so that the batches are raised by the movable pockets from the bin to the inlet location.

25. The invention of claim 23 including a rail having a length extending along the first segment of the path of travel, the rail having a configuration complementary to at least a portion of the cap of the cap assembly for receiving and holding each cap assembly in the oriented position during advancement of the cap assemblies along the first segment.

26. The invention of claim 25 wherein the length of the rail is great enough to enable the oriented cap assemblies to be stabilized in the oriented position during advancement along the first segment of the path of travel.

27. The invention of claim 23 including means for accelerating the cap assemblies during movement between the first and second segments of the path of travel so as to increase the space between consecutive cap assemblies moving between the first and second segments of the path of travel.

28. The invention of claim 27 wherein the transfer means includes means for accelerating the cap assemblies to increase the space between consecutive cap assemblies so that consecutive cap assemblies entering the second orienting means are spaced apart a greater distance than consecutive cap assemblies leaving the first orienting means.

29. The invention of claim 27 or 28 wherein the second orienting means includes means for accelerating the cap assemblies to increase the space between consecutive cap assemblies so that consecutive cap assemblies leaving the second orienting means are spaced apart further than consecutive cap assemblies entering the second orienting means.

30. The invention of claim 23 or 24 wherein the feed means advances an excess number of cap assemblies to the first orienting means, and the apparatus includes means for returning the excess number to the bin.

31. The invention of claim 23 wherein the first orienting means includes:

a vertically-extending frusto-conical surface diverging outwardly and downwardly from a smaller diameter crown toward a larger diameter base, the crown being juxtaposed with the inlet location and the base being adjacent the first segment of the path of travel;

a generally cylindrical fence extending vertically upwardly from adjacent the base of the frusto-conical surface;

a plurality of essentially vertical partitions carried by the frusto-conical surface and establishing compartments rotatable about the generally vertical axis for receiving at least one cap assembly within each compartment; and a baffle extending into each compartment generally radially outwardly from the frusto-conical surface toward the fence, intermediate the crown and the base, and having an outer periphery with a diameter less than the diameter of the base so as to establish a slot in each compartment between the outer periphery of the baffle and the fence, whereby rotation of the compartments about the generally vertical axis will tend to move the cap assemblies in the compartments radially outwardly with the caps leading the dip tubes such that the cap assemblies will drop downwardly off the baffle, caps first, toward the first segment of the path of travel, and will arrive at the first segment of the path of travel oriented with the caps lowermost and the dip tubes extending vertically upwardly.

32. The invention of claim 31 wherein the baffle is generally horizontal.

33. The invention of claim 31 wherein the vertical partitions extend radially outwardly to the fence so as to assure that all of the cap assemblies within each compartment are swept along with the movement of the compartment.

34. The invention of claim 31 including a rail extending along the first segment of the path of travel, the rail having a configuration complementary to at least a portion of the cap of the cap assembly and being located beneath the slot of each compartment for receiving and holding each cap assembly which drops downwardly from the baffle.

35. The invention of claim 31 including means for returning to the bin excess cap assemblies advanced to each compartment.

36. The invention of claim 23 or 31 wherein the second orienting means includes:
   a wheel mounted for rotation about a generally horizontal axis; and
   a channel of prescribed width around the periphery of the wheel, the channel being essentially tangent to the first segment of the path of travel for receiving the orienting cap assemblies from the first segment, and being tangent to the second segment of the path of travel for releasing the cap assemblies into the second segment, the relative dimensions of the channel and the cap assemblies received therein being such that the cap assemblies are gripped positively in an interference fit with the wheel and advanced along an arcuate segment of the path of travel extending between the first and second segments of the path of travel such that the cap assemblies thus placed at the second segment are inverted relative to the cap assemblies in the first segment.

37. The invention of claim 36 the wheel is comprised of opposed discs spaced apart axially to establish the channel around the periphery of the discs.

38. The invention of claim 37 wherein at least one of the opposed discs is divided into radially extending fingers adjacent the channel such that the fingers will flex axially in response to the reception of a cap assembly into the channel and release of a cap assembly from the channel.

39. The invention of claim 38 including resilient biasing means biasing the fingers toward the channel.

40. The invention of claim 36 wherein the first segment of the path of travel is located above the second segment of the path of travel.

41. The invention of claim 23 wherein the conveyor means includes:
   a track extending along the third segment of the path of travel for supporting the cap assemblies in the re-oriented position; and
   a conveyor for advancing the cap assemblies along the track, the conveyor having means for engaging the cap assemblies for advancement thereof and for releasing such engagement with a particular cap assembly in response to abutment of that cap assembly with a stopped cap assembly immediately ahead of the particular cap assembly such that consecutive cap assemblies on the track will not become locked together or jammed within the track.

42. The invention of claim 41 wherein the conveyor includes:
   a carrier extending longitudinally generally parallel to the track and mounted for continuous movement relative to the track; and
   a plurality of flexible members carried by the carrier and juxtaposed with the track so as to extend into the third segment of the path of travel and engage the cap assemblies, the flexible members being spaced longitudinally to engage consecutive cap assemblies;
   the flexibility of the flexible members being such that engagement of a flexible member with a particular cap assembly will tend to advance that cap assembly with movement of the conveyor and stopping of that cap assembly by the abutment of that cap assembly with a stopped cap assembly immediately ahead of the particular cap assembly will cause flexing of the flexible member so that the flexible members will pass over stopped cap assemblies.

43. The invention of claim 42 wherein:
   the conveyor is an endless belt; and
   the flexible members are pushers extending laterally from the belt.

44. The invention of claim 43 wherein the endless belt is constructed of a flexible material and the pushers are integral elements of the flexible material.

45. The invention of claim 42, 43 or 44 wherein the conveyor includes at least two sections, each section being located along the third segment of the path of travel with one section located subsequent to the other, and latching means located between the sections and responsive to cap assemblies accumulated in the one section for holding cap assemblies in the other section in response to the accumulation of cap assemblies in the one section.

46. In an apparatus for orienting and delivering dispenser cap assemblies of the type having a relatively heavier cap and a relatively lighter dip tube advanced along a path of travel from a bin containing randomly oriented cap assemblies to a discharge point where the cap assemblies are presented serially in a prescribed orientation for capping operations, the improvement comprising:
   feed means for feeding cap assemblies from the bin to an inlet location along the path of travel; and
   orienting means located along the path of travel and including means rotatable about a generally vertical axis for receiving cap assemblies at the inlet location and imparting generally spiral outward movement to the cap assemblies to place the heavier caps of at least some of the cap assemblies outwardly relative to the respective lighter dip tubes of the cap aasemblies and means for allowing the outwardly-placed caps of the cap assemblies to drop downwardly ahead of the respective dip tubes of the cap assemblies so as to orient at least some of the cap assemblies with the dip tubes thereof extending essentially vertically and the caps thereof located below the respective dip tubes, and to place the oriented cap assemblies along a generally horizontal first segment of the path of travel.

47. In an apparatus for orienting and delivering dispenser cap assemblies of the type having a relatively heavier cap and a relatively lighter dip tube advanced along a path of travel from a bin containing randomly oriented cap assemblies to a discharge point where the cap assemblies are presented serially in a prescribed orientation for capping operations, the improvement comprising:
   feed means for feeding cap assemblies from the bin to an inlet location along the path of travel; and
   orienting means located along the path of travel and including:
   means rotatable about a generally vertical axis for receiveing cap assemblies at the inlet location and imparting generally spiral outward movement to the cap assemblies to place the heavier caps of at least some of the cap assemblies outwardly relative to the respective lighter dip tubes of the cap assemblies;
   means for allowing the outwardly-placed caps of the cap assemblies to drop dorwnwardly ahead of the respective dip tubes of the cap assemblies so as to orient at least some of the cap assemblies with the dip tubes thereof extending essentially vertically and the caps thereof located below the respective dip tubes, and to place the oriented cap assemblies along a generally horizontal first segment of the path of travel;

a vertically-extending frusto-conical surface diverging outwardly and downwardly from a small diameter crown toward a larger diameter base, the crown being juxtaposed with the inlet location and the base being adjacent the first segment of the path of travel;

a generally cylindrical fence extending vertically upwardly from adjacent the base of the frusto-conical surface;

a plurality of essentially vertical partitions carried by the frusto-conical surface and establishing compartments rotatable about the generally vertical axis for receiving at least one cap assembly within each compartment; and a baffle extending into each compartment generally radially outwardly from the frusto-conical surface toward the fence, intermediate the crown and the base, and having an outer periphery with a diameter less than the diameter of the base so as to establish a slot in each compartment between the outer periphery of the baffle and the fence, whereby rotation of the compartments about the generally vertical axis will tend to move the cap assemblies in the compartments radially outwardly with the caps leading the dip tubes such that the cap assemblies will drop downwardly off the baffle, caps first, toward the first segment of the path of travel, and will arrive at the first segment of the path of travel oriented with the caps lowermost and the dip tubes extending vertically upwardly.

48. The invention of claim 47 wherein the baffle is generally horizontal.

49. The invention of claim 47 wherein the vertical partitions extend radially outwardly to the fence so as to assure that all of the cap assemblies within each compartment are swept along with the movement of the compartment.

50. The invention of claim 47 including a rail extending along the first segment of the path of travel, the rail having a configuration complementary to at least a portion of the cap of the cap assembly and being located beneath the slot of each compartment for receiving and holding each cap assembly which drops downwardly from the baffle.

51. The invention of claim 47 including means for returning to the bin excess cap assemblies advanced to each compartment.

52. In an apparatus for orienting and delivering dispenser cap assemblies of the type having a cap and a dip tube advanced along a path of travel from a bin containing randomly oriented cap assemblies to a discharge point where the cap assemblies are presented serially in a prescribed orientation for capping operations, the improvement comprising:

orienting means located along the path of travel and including rotatable means rotatable about an axis for receiving oriented cap assemblies from a first segment of the path of travel and positively gripping each cap assembly to invert the received cap assemblies and re-orient and place the received cap assemblies along a second segment of the path of travel with the relative positions of the cap and dip tube of each cap assembly reversed, the rotatable means including a wheel mounted for rotation about a generally horizontal axis; and a channel of prescribed width around the periphery of the wheel, the channel being essentially tangent to the first segment of the path of travel for receiving the oriented cap assemblies from the first segment, and being tangent to the second segment of the path of travel for releasing the cap assemblies into the second segment, the relative dimensions of the channel and the cap assemblies received therein being such that the cap assemblies are gripped positively in an interference fit with the wheel and advanced along an arcuate segment of the path of travel extending between the first and second segments of the path of travel such that the cap assemblies thus placed at the second segment are inverted relative to the cap assemblies in the first segment;

the wheel including opposed discs spaced apart axially to establish the channel around the periphery of the discs, at least one of the opposed discs being divided into radially extending fingers adjacent the channel such that the fingers will flex axially in response to the reception of a cap assembly into the channel and release of a cap assembly from the channel.

53. The invention of claim 52 including resilient biasing means biasing the fingers toward the channel.

54. The invention of claim 52 or 53 wherein the first segment of the path of travel is located above the second segment of the path of travel.

55. In an apparatus for orienting and delivering dispenser cap assemblies of the type having a cap and a dip tube advanced along a path of travel from a bin containing randomly oriented cap assemblies to a discharge point, where the cap assemblies are presented serially in a prescribed orientation for capping operations, the improvement comprising:

conveyor means for receiving cap assemblies in an oriented position from a segment of the path of travel and conveying the received cap assemblies along a generally horizontal further segment of the path of travel to the discharge point, the conveyor means including a track extending along the further segment of the path of travel for supporting the cap assemblies in the oriented position; and a conveyor for advancing the cap assemblies along the track, the conveyor having means for engaging the cap assemblies for advancement thereof and for releasing such engagement with a particualr cap assembly in response to abutment of that cap assembly with a stopped cap assembly immediately ahead of the particular cap assembly such that consecutive cap assemblies on the track will not become locked together or jammed within the track, the conveyor including a carrier extending longitudinally generally parallel to the track and mounted for continuous movement relative to the track;

a plurality of flexible members carried by the carrier and juxtaposed with the track so as to extend into the third segment of the path of travel and engage the cap assemblies, the flexible members being spaced longitudinally to engage consecutive cap assemblies;

the flexibility of the flexible members being such that engagement of a flexible member with a particular cap assembly will tend to advance that cap assembly with movement of the conveyor, and stopping of that cap assembly by the abutment of that cap assembly with a stopped cap assembly immediately ahead of the particular cap assembly will cause flexing of the flexible member so that the flexible members will pass over stopped cap assemblies; and at least two sections, each section being located along the third segment of the path of travel with one section located subsequent to the other, and latching means located between the sections and responsive to cap assemblies accumlated in the one section for holding cap assemblies in the other section in response to the accumulation of cap assemblies in the one section.

56. The invention of claim 55 wherein:
the conveyor is an endless belt; and
the flexible members are pushers extending laterally from the belt.

57. The invention of claim 56 wherein the endless belt is constructed of a flexible material and the pushers are integral elements of the flexible material.

* * * * *